United States Patent
Freiburger et al.

(10) Patent No.: US 8,569,683 B2
(45) Date of Patent: Oct. 29, 2013

(54) METHOD AND DEVICE FOR MONITORING AN AUTOMATIC DRIFT COMPENSATION

(75) Inventors: Ewald Freiburger, Neulingen (DE); Juergen Briggmann, Stuttgart (DE); Gerhard Kappler, Bad Liebenzell (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 198 days.

(21) Appl. No.: 12/731,890

(22) Filed: Mar. 25, 2010

(65) Prior Publication Data

US 2010/0243878 A1 Sep. 30, 2010

(30) Foreign Application Priority Data

Mar. 30, 2009 (EP) .................................... 09004569

(51) Int. Cl.
*G01T 1/208* (2006.01)
*G12B 13/00* (2006.01)

(52) U.S. Cl.
USPC ............... 250/252.1; 250/363.01; 250/369

(58) Field of Classification Search
USPC ................................................. 250/336.01
See application file for complete search history.

(56) References Cited

U.S. PATENT DOCUMENTS

| | | | |
|---|---|---|---|
| 3,428,804 A | 2/1969 | Communnetti | |
| 3,767,921 A | 10/1973 | Jones | |
| 3,800,143 A | 3/1974 | Fishman et al. | |
| 3,922,541 A * | 11/1975 | Seeman | 250/256 |
| 4,272,677 A * | 6/1981 | Berthold et al. | 250/252.1 |
| 4,611,117 A * | 9/1986 | Seibert et al. | 250/252.1 |
| 5,218,202 A * | 6/1993 | Evers | 250/252.1 |
| 6,064,068 A | 5/2000 | Bartle | |

FOREIGN PATENT DOCUMENTS

| | | |
|---|---|---|
| DE | 1809 520 | 2/1970 |
| DE | 41 14 030 C1 | 9/1992 |
| GB | 1226924 | 3/1971 |

* cited by examiner

*Primary Examiner* — Marcus Taningco
(74) *Attorney, Agent, or Firm* — Pearl Cohen Zedek Latzer Baratz, LLP

(57) ABSTRACT

A device for monitoring an automatic drift compensation of a scintillation counter may include a drift compensation monitoring unit which is designed to evaluate a counting rate caused by a monitoring radiation source for the purpose of monitoring the automatic drift compensation.

6 Claims, 3 Drawing Sheets

METHOD AND DEVICE FOR MONITORING AN AUTOMATIC DRIFT COMPENSATION

CROSS REFERENCE TO RELATED APPLICATION

This application claims priority from European Patent Application, 09004569.1, filed Mar. 30, 2009, which is incorporated by reference herein in its entirety.

FIELD OF INVENTION

The invention relates to monitoring an automatic drift compensation of a scintillation counter.

BACKGROUND OF INVENTION

In process metrology, radiometric measurement systems comprising scintillation counters or scintillation detectors for the measurement of radiation are often used for measuring process variables or material properties, for example for filling level measurement, for moisture measurement, for density measurement etc.

Scintillation counters serve, for example, for determining the spectrum of ionizing radiation, that is to say for determining the intensity as a function of the energy of the ionizing radiation, wherein a scintillation counter comprises a scintillator, which is excited during the passage of radiation in the form of high-energy charged particles or photons and emits the excitation energy again in the form of light pulses (usually in the UV or visible range), this being referred to as scintillation.

The light pulses generated in this way are converted into electrical signals by means of a suitable optical sensor and amplified. Such a sensor is typically a photomultiplier or a photodiode. The optical sensor outputs pulses, wherein a number of pulses per unit time, that is to say the counting rate, is a measure of the intensity of the radiation and a pulse height or pulse amplitude (more precisely an integral over the temporal profile of the pulse) is a measure of the energy of the radiation.

In order to measure a process variable in the form of a filling level in a container, by way of example, the radiation from a working radiation source can be applied to the container on one side and an intensity of the radiation can be measured on the opposite side to the working radiation source by means of a scintillation counter. The measured intensity or counting rate is dependent on the filling level of the container since, when material to be measured is present in the beam path, part of the radiation is absorbed by the material to be measured, that is to say that the filling level can be determined in a manner dependent on the measured counting rate.

The measured counting rate is subject to drift effects, however, which can be caused for example by temperature fluctuations, ageing effects of the scintillator and/or of the photomultiplier and/or drift effects in evaluation electronics. These drift effects lead to measurement errors which can make it impossible to determine the process variable reliably.

A method for the automatic drift compensation of a scintillation counter is described in U.S. Pat. No. 3,800,143, for example. For the purpose of drift compensation, a first counting rate of pulses whose energy level or pulse height lies above a first predeterminable threshold is determined, and a second counting rate of pulses whose energy level or pulse height lies above a second predeterminable threshold is determined. The pulse height depends not only on the energy of the observed particle or photon but also on a total gain or a total gain factor of the scintillation counter, which determines the pulse height for a given energy of the particle or photon impinging on the scintillator. The gain is determined, inter alia, by a level of a high voltage applied to the photomultiplier and by the gain of evaluation electronics that generate from the signal output by the photomultiplier, by means of analogue conditioning, a signal in a level range suitable, for example, for digital evaluation by means of a comparator and a microprocessor connected downstream. The change in the total gain, for example as a result of a change in the high voltage supplying the photomultiplier, brings about a change in the spectrum measured by the scintillation counter in the energy direction, as a result of which a counting rate ratio between the first counting rate and the second counting rate changes. It has been found that, with a suitable choice of the thresholds, the counting rate ratio is substantially determined only by the working radiation source used and, in the case of a filling level measurement, for example, does not depend significantly on the filling level. Consequently, a drift compensation can be obtained by the total gain being adjusted in tracking fashion in such a way that the counting rate ratio corresponds to a predetermined function, in particular remains constant.

This type of drift compensation presupposes that the gain is adjustable in the course of a compensation process in such a way that the desired counting rate ratio is produced. However, since the working radiation source is used for drift compensation, said source also serving for measuring the process variable, the actual radiation intensity at the scintillator is dependent on whether media, and if appropriate which media, are situated in a radiation path. Therefore, the drift compensation is not subject to exactly predictable boundary conditions. If, by way of example, an excessively low counting rate is determined at the beginning of a drift compensation on account of highly absorbent media in the radiation path, the total gain is increased, for example as a result of the high voltage of the photomultiplier being increased. If the desired ratio is not established, the total gain is increased further, as a result of which noise pulses possibly also contribute to the measured counting rate. This, in turn, can lead to a corruption of a measured process variable, which is impermissible in the case of systems having a functional safety prescribed by the standards, for example.

BRIEF DESCRIPTION OF THE DRAWINGS

Embodiments of the invention are illustrated schematically in the drawings and are explained in greater detail below. In this case.

Figure 1:
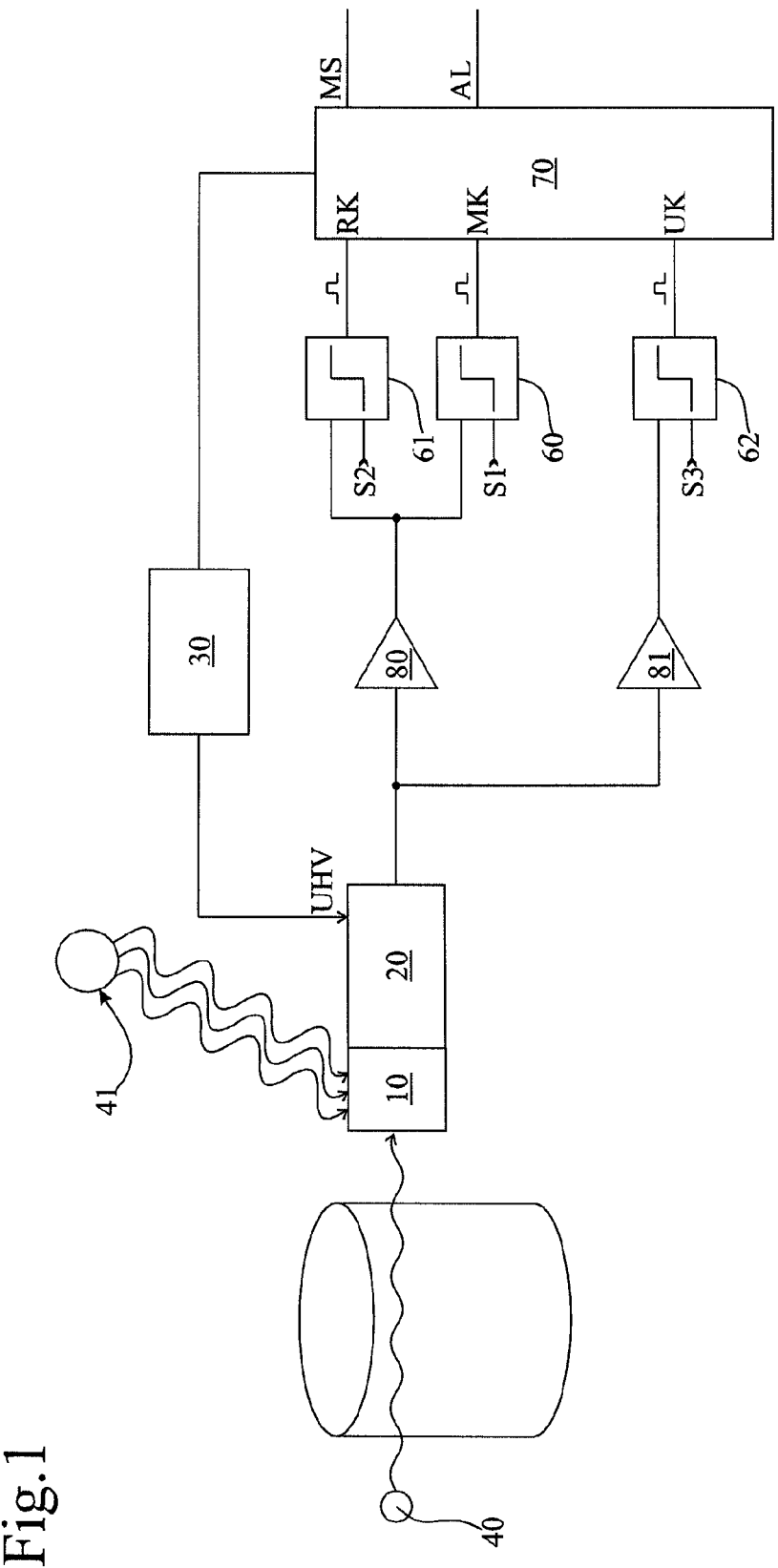
FIG. 1 shows a first embodiment of a device according to the invention for monitoring an automatic drift compensation of a scintillation counter.

If an element is referred to as being coupled or connected to another element, the element can be coupled or connected directly to the other element or interposed elements can be present. However, if an element is referred to as being directly coupled or directly connected to another element, no interposed elements are present.

DETAILED DESCRIPTION OF THE DRAWINGS

An embodiment of the invention is based on the object of providing a method and a device for monitoring an automatic drift compensation of a scintillation counter which monitor a drift compensation reliably with regard to the proper function thereof.

One embodiment of the invention achieves this object by means of a method for monitoring an automatic drift compensation of a scintillation counter having a scintillator, wherein the radiation from a working radiation source with a working radiation source energy spectrum is applied to the scintillator for automatic drift compensation, wherein the radiation from a monitoring radiation source with a monitoring radiation source energy spectrum, which differs from the working radiation source energy spectrum, is applied to the scintillator, and a counting rate caused by the monitoring radiation source is evaluated for the purpose of monitoring the automatic drift compensation; and by means of a device for monitoring an automatic drift compensation of a scintillation counter, including a drift compensation monitoring unit, which is designed to evaluate a counting rate caused by a monitoring radiation source for the purpose of monitoring the automatic drift compensation.

Other embodiments are the subject matter of the dependent claims, the wording of which is incorporated by reference in the content of the description in order to avoid unnecessary repetition.

In a method according to an embodiment of the invention for monitoring an automatic drift compensation of a scintillation counter with a scintillator, the radiation from a working radiation source with a working radiation source energy spectrum may be applied to the scintillator for automatic drift compensation; in this respect, also see the patent specification DE 18 09 520. In addition, the radiation from a monitoring radiation source, which is independent of the working radiation source, with a monitoring radiation source energy spectrum, which differs from the working radiation source energy spectrum, may be applied to the scintillator. The radiation emitted by the monitoring radiation source preferably has a constant intensity, which brings about a predictable or known counting rate. A counting rate caused by the monitoring radiation source is evaluated for the purpose of monitoring the automatic drift compensation. The counting rate can be averaged before the evaluation over a time range of a few minutes to a few hours. If the gain is changed impermissibly in the course of a drift compensation process, the counting rate caused by the monitoring radiation source also changes. Since said counting rate is predictable or known, it can be used to monitor the proper function of the drift compensation.

In one embodiment, the monitoring radiation source energy spectrum has spectral components which have a higher energy level than spectral components of the working radiation source energy spectrum.

In one embodiment, the radiation from the monitoring radiation source is cosmic radiation. As an alternative, the monitoring radiation source is a potassium-40 radiation source.

In one embodiment, a malfunction of the automatic drift compensation is determined if the counting rate caused by the monitoring radiation source exceeds an upper counting rate threshold or falls below a lower counting rate threshold.

In one embodiment, the automatic drift compensation comprises the following steps: generating amplified electrical pulses having a level that is dependent on the energy of an observed particle or photon of the radiation source and on the gain, determining a first counting rate of pulses having a level that lies above a first threshold, determining a second counting rate of pulses having a level that lies above a second threshold, the second threshold lying above the first threshold, and controlling the gain in such a way that a ratio between the first counting rate and the second counting rate corresponds to a predetermined function, in particular remains constant. The ratio can be, for example, a function of a total counting rate. In this case, the total counting rate is that counting rate which is caused by pulses which just exceed a lowest detection threshold.

In one embodiment, a counting rate caused by the working radiation source is evaluated not only for the purpose of drift compensation but also for the purpose of measuring a process variable. The measurement of the process variable can be, for example, a filling level measurement, a moisture measurement, a density measurement, etc.

The device according to an embodiment of the invention for monitoring an automatic drift compensation of a scintillation counter may be designed, in particular, for carrying out the abovementioned method. The device comprises a drift compensation monitoring unit, which is designed to evaluate a counting rate caused by a monitoring radiation source for the purpose of monitoring the automatic drift compensation.

In one embodiment, the device comprises a scintillator, an optical sensor, which is optically coupled to the scintillator, wherein the optical sensor generates electrical pulses having a level that is dependent on the energy of an observed particle of a radiation source, an amplifying unit, which is electrically coupled to the optical sensor and which is designed to amplify the electrical pulses of the optical sensor with a variable gain factor, a first comparator coupled to the optical sensor, which first comparator generates a pulse at its output if the level of the pulse generated by the optical sensor and amplified lies above a first threshold, a second comparator coupled to the optical sensor, which second comparator generates a pulse at its output if the level of the pulse generated by the optical sensor and amplified lies above a second threshold, the second threshold lying above the first threshold, and a drift compensation unit, which is connected to the amplifying unit and to the respective output of the first and of the second comparators and which is designed to adjust the gain factor in tracking or follow up fashion in such a way that a ratio between a counting rate of the pulses at the output of the first comparator and a counting rate of the pulses at the output of the second comparator corresponds to a predetermined function, in particular remains constant, wherein the drift compensation monitoring unit comprises: a third comparator coupled to the optical sensor, which third comparator generates a pulse at its output if the level of the pulse generated by the optical sensor and amplified lies above a third threshold, the third threshold differing from the first threshold and the second threshold, and a counting rate monitoring unit, which evaluates a counting rate of the pulses at the output of the third comparator for the purpose of monitoring the automatic drift compensation.

In one embodiment, the third threshold lies energetically above the first threshold and the second threshold.

In one embodiment, the scintillator is an NaI(Tl) crystal, that is to say a sodium iodide crystal doped with thallium. Alternatively, other scintillator materials can also be used.

In one embodiment, the device comprises a working radiation source. The working radiation source is preferably a Cs-137 radiation source. Depending on the respective measurement task, other working radiation sources can be used, for example Co-60 working radiation sources, Am-241 working radiation sources, Cm-244 working radiation sources, etc.

In one embodiment, the device comprises a monitoring radiation source. The monitoring radiation source is preferably a potassium-40 radiation source.

In one embodiment, the optical sensor comprises a photomultiplier, and the amplifying unit comprises an adjustable high-voltage source for generating an adjustable high voltage for the photomultiplier, wherein the photomultiplier generates electrical pulses having a level that is dependent on the high voltage and on the energy of an observed particle, and wherein the drift compensation unit is connected to the high-voltage source and is designed to adjust the high voltage in tracking fashion in such a way that the ratio between the counting rate of the pulses at the output of the first comparator and the counting rate of the pulses at the output of the second comparator corresponds to a predetermined function, in particular remains constant.

In one embodiment, the optical sensor comprises a photodiode, and the amplifying unit comprises an amplifier having an adjustable gain, wherein the drift compensation unit is connected to the amplifier and is designed to adjust the adjustable gain in tracking fashion in such a way that the ratio between the counting rate of the pulses at the output of the first comparator and the counting rate of the pulses at the output of the second comparator corresponds to a predetermined function, in particular remains constant.

FIG. 1 shows a device according to an embodiment of the invention for monitoring an automatic drift compensation of a scintillation counter. The device shown may include a scintillator in the form of an NaI(Tl) crystal 10, which is optically coupled to an optical sensor in the form of a photomultiplier 20. An amplifying unit in the form of an adjustable high-voltage source 30 may serve for generating an adjustable high voltage UHV for the photomultiplier 20, wherein the photomultiplier 20 may generate electrical pulses having a level or an amplitude which is dependent on the high voltage UHV and the energy of an observed particle or photon of a working radiation source 40 or the energy of an observed particle or photon of a monitoring radiation source 41. In the embodiment shown, the working radiation source 40 is a Cs-137 radiation source. In the embodiment shown, the monitoring radiation source 41 is formed by high-energy particle radiation from the cosmos, that is to say cosmic radiation, but can alternatively or additionally be a potassium-40 radiation source.

A first comparator 60, a second comparator 61 and a third comparator 62 may be coupled to an output of the photomultiplier 20 via an amplifier 80 and a second amplifier 81, respectively. A suitable gain ratio between the amplifier 80 and the amplifier 81 may be chosen.

The first comparator 60 may generate a pulse at its output if the level of the pulse generated by the photomultiplier 20 or a pulse height or pulse amplitude lies above a first threshold S1. The second comparator 61 may generate a pulse at its output if the level of the pulse generated by the photomultiplier 20 lies above a second threshold S2, the second threshold S2 lying above the first threshold S1. The third comparator 62 may generate a pulse at its output if the level of the pulse generated by the photomultiplier 20 lies energetically above a third threshold S3, the third threshold S3 differing from the first threshold S1 and the second threshold S2, in the present case being greater than the first and the second thresholds S1 and S2.

A microprocessor 70 may be connected by a control channel input RK to the output of the second comparator 61, connected by a measurement channel input MK to the output of the first comparator 60 and connected by a monitoring channel input UK to the output of the third comparator 62.

The microprocessor 70 may form, inter alia, a drift compensation unit and may be programmed in such a way that, by means of suitable controlling of the high-voltage source 30, it adjusts the high voltage UHV in tracking fashion in such a way that a ratio between a counting rate of the pulses at the output of the first comparator 60 and a counting rate of the pulses at the output of the second comparator 61 corresponds to a predetermined function, in particular remains constant. Alternatively, the microprocessor 70 can be programmed in such a way that, by means of suitable controlling of the high-voltage source 30, it adjusts the high voltage UHV in tracking fashion in such a way that the ratio between the counting rate of the pulses at the output of the first comparator 60 and the counting rate of the pulses at the output of the second comparator 61 corresponds to the predetermined function, in particular remains constant, if the counting rate at the measurement channel input MK lies below a predetermined threshold, and that, by means of suitable controlling of the high-voltage source 30, it adjusts the high voltage UHV in tracking fashion in such a way that the absolute counting rate at the control channel input RK remains constant if the counting rate lies above the predetermined threshold.

In order to monitor the proper function of the drift compensation, the latter may be monitored by a drift compensation monitoring unit comprising the amplifier 81, the third comparator 62 and a counting rate monitoring unit in the form of the microprocessor 70, which evaluates a counting rate of the pulses at the output of the third comparator 62, that is to say at its monitoring channel input UK, for the purpose of monitoring the automatic drift compensation. A malfunction of the automatic drift compensation is ascertained if the counting rate caused by the monitoring radiation source 41, that is to say the counting rate at the monitoring channel input UK, exceeds an upper counting rate threshold or falls below a lower counting rate threshold. For this purpose, the counting rate may be averaged before evaluation over a time range of a few minutes to a few hours. The counting rate thresholds result from a theoretically expected value, which is dependent, inter alia, on the monitoring radiation source used, the scintillator material, the scintillator size, etc. The counting rate thresholds can be determined computationally or else empirically.

If the gain is changed in the course of a drift compensation process, the counting rate caused by the monitoring radiation source 40 also may change. Since this counting rate is predictable or known, it can be used to monitor the proper function of the drift compensation. If, by way of example, the gain is erroneously set to excessively high values in the course of a drift compensation process, an excessively high counting rate lying above the upper predetermined counting rate threshold arises at the monitoring channel input UK. On the basis of this, the microprocessor can ascertain a malfunction, reduce the high voltage UHV to non-critical values by means of suitable controlling of the high-voltage source 30 and output an alarm signal AL.

The microprocessor 70 also may output a measurement signal MS in addition to the alarm signal AL, which measurement signal may map the value of a process variable, for example a filling level of a container, in a manner dependent on the counting rate at the measurement channel input MK.

Figure 2:
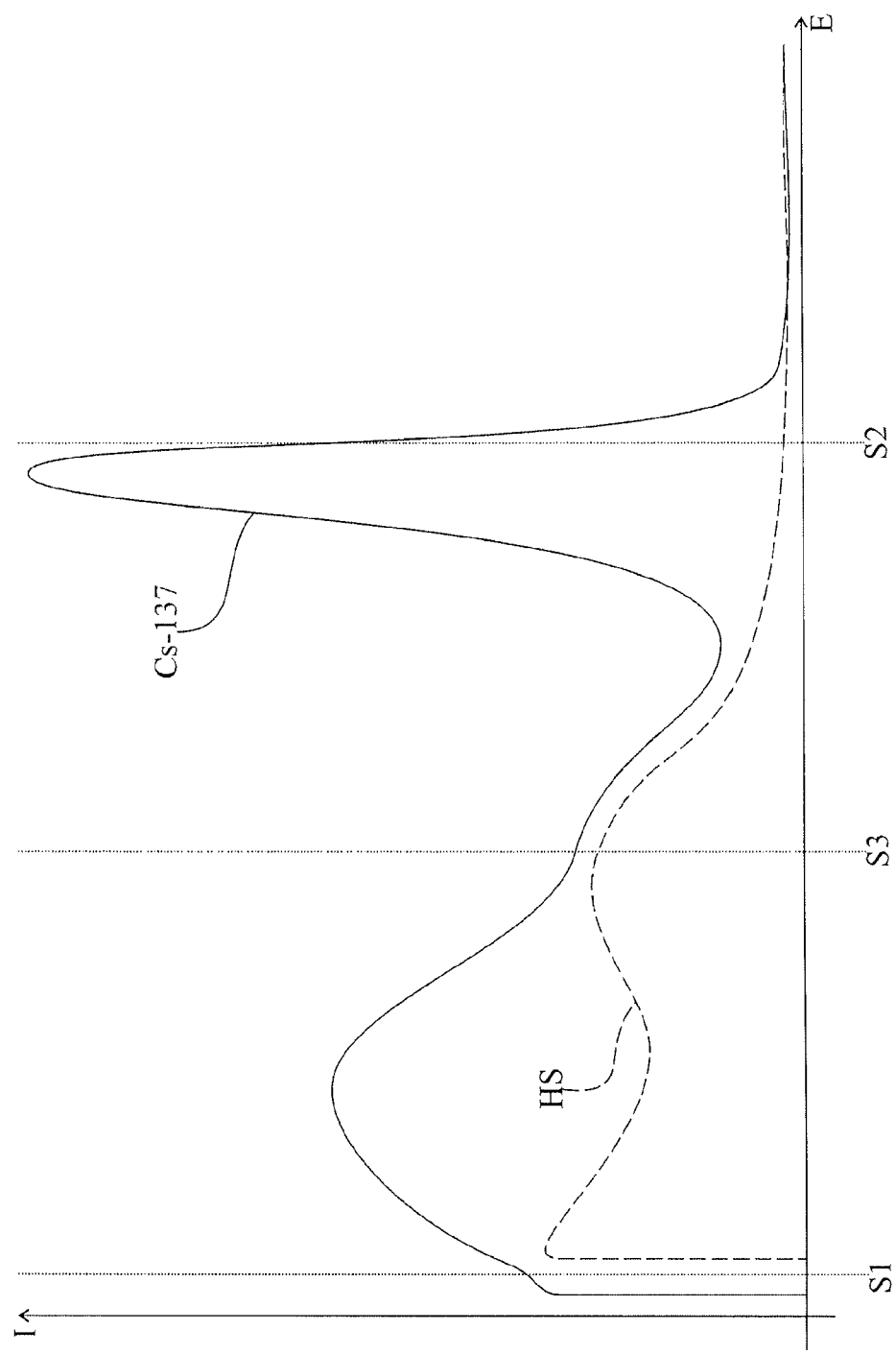
FIG. 2 shows an energy spectrum of a working radiation source and an energy spectrum of a monitoring radiation source with associated threshold values in one embodiment of the invention.

FIG. 2 shows an energy spectrum Cs-137 of the Cs-137 radiation source 40 as working radiation source and an energy spectrum HS of the cosmic radiation 41 as monitoring radiation source with associated threshold values S1 to S3 (also see FIG. 1) according to one embodiment. The energy E may be plotted on the X-axis and the intensity I, that is to say the counting rate, is plotted on the Y-axis. It should be noted that, for reasons of depictability, the actual energy values on the X-axis are different for the curves Cs-137 and HS since the gain ratio between signals at the output of the amplifier 80 and signals at the output of the amplifier 81 was chosen suitably. The energy spectrum HS of the cosmic radiation consequently has spectral components which have a significantly higher energy level than the spectral components of the working radiation Cs-137, that is to say would be shifted distinctly towards the right given uniform scaling of the energy axis.

As emerges from FIG. 2, the measurement threshold S1 may be chosen in such a way that substantially all the photons of the working radiation source 40 which are detected by the scintillator lead to a pulse at the measurement channel input MK. The control threshold S2 is chosen in such a way that only photons slightly above the maximum of the so-called photopeak at 662 keV lead to a pulse at the control channel input RK. In the simplest case of a drift compensation, the counting rate of these pulses may be kept constant. Otherwise, a ratio between the counting rate of the pulses at the control channel input RK and at the measurement channel input MK is kept constant.

The monitoring threshold S3 is chosen suitably in a manner dependent on the energy spectrum of the monitoring radiation source 41, that is to say is energetically distinctly different from the thresholds S1 and S2, e.g. only photons having an energy above said threshold S3 lead to a pulse at the monitoring channel input UK. If the counting rate in the monitoring channel UK deviates from the desired counting rate by a specific amount after a suitably long average time, an incorrect gain or an incorrectly set high voltage UHV can be deduced, the device can be transferred to a safe state and a fault can be output.

Figure 3:
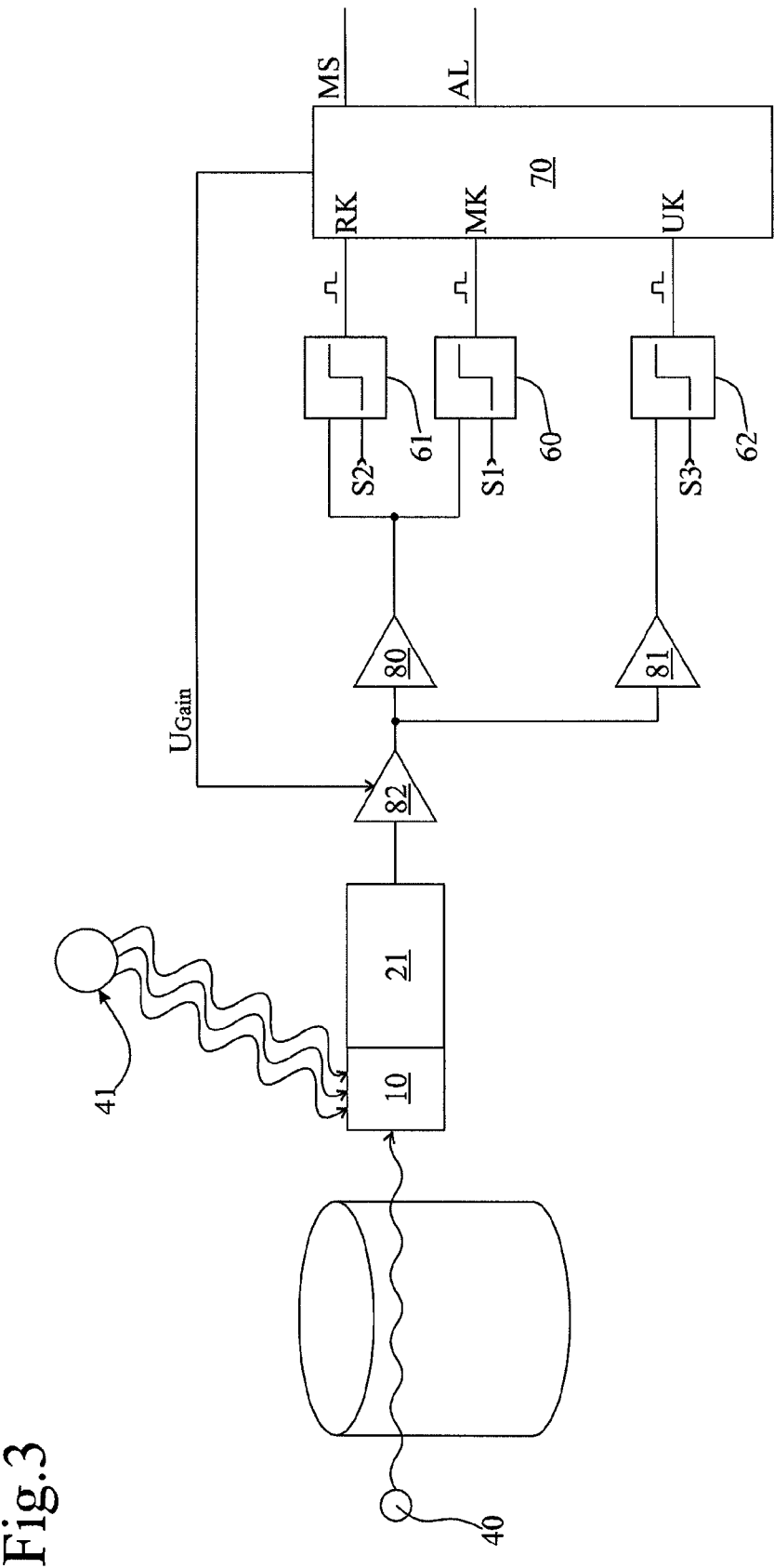
FIG. 3 shows a second embodiment of a device according to the invention for monitoring an automatic drift compensation of a scintillation counter in one embodiment of the invention.

FIG. 3 shows an embodiment of a device according to the invention for monitoring an automatic drift compensation of a scintillation counter. In the case of the embodiment shown in FIG. 3, an optical sensor in the form of a photodiode 21 is provided. For the purpose of drift compensation, that is to say for the purpose of correct operating point setting, a setting voltage UGain may be applied to an amplifying unit in the form of an amplifier 82 having an adjustable gain, said setting voltage being generated by the microprocessor 70 in a manner dependent on the counting rates at the control channel RK and at the measurement channel MK. For the rest, the embodiments shown in FIGS. 1 and 3 are identical.

The embodiments shown enable the reliable monitoring of the function of the drift compensation by means of a long-term recording and averaging of the cosmic radiation pulses from an independent counting channel UK. In other words, the ever-present cosmic radiation is used as a second independent function criterion for the correct drift compensation.

The invention claimed is:

1. A method for monitoring an automatic drift compensation of a scintillation counter having a scintillator, comprising:
    applying the radiation from a working radiation source with a working radiation source energy spectrum to the scintillator for automatic drift compensation,
    applying the radiation from a monitoring radiation source with a monitoring radiation source energy spectrum, which differs from the working radiation source energy spectrum, to the scintillator, and
    evaluating a counting rate caused by the monitoring radiation source for the purpose of monitoring the automatic drift compensation
    wherein the automatic drift compensation comprises:
        generating amplified electrical pulses having a level that is dependent on the energy of an observed particle of the radiation source and on a gain of the amplification,
        determining a first counting rate of pulses having a level that lies above a first threshold,
        determining a second counting rate of pulses having a level that lies above a second threshold, the second threshold lying above the first threshold, and
        controlling the gain in such a way that a ratio between the first counting rate and the second counting rate corresponds to a predetermined function, in particular remains constant.

2. A method according to claim 1, wherein the monitoring radiation source energy spectrum has spectral components which have a higher energy level than spectral components of the working radiation source energy spectrum.

3. A method according to claim 1, wherein in that the radiation from the monitoring radiation source is cosmic radiation.

4. A method according to claim 1, wherein the monitoring radiation source is a potassium-40 radiation source.

5. A method according to claim 1, comprising determining a malfunction of the automatic drift compensation if the counting rate caused by the monitoring radiation source exceeds an upper counting rate threshold or falls below a lower counting rate threshold.

6. A method according to claim 1, wherein a counting rate caused by the working radiation source is evaluated for the purpose of measuring a process variable.

* * * * *